(12) United States Patent
Artuso (10) Patent No.: US 11,544,941 B2
(45) Date of Patent: Jan. 3, 2023

(54) BACK SEAT DETECTION SYSTEMS AND METHODS

(71) Applicant: T-Mobile USA, Inc., Bellevue, WA (US)

(72) Inventor: Daniel Artuso, Seattle, WA (US)

(73) Assignee: T-MOBILE USA, INC., Bellevue, WA (US)

(*) Notice: Subject to any disclaimer, the term of this patent is extended or adjusted under 35 U.S.C. 154(b) by 260 days.

(21) Appl. No.: 16/859,389

(22) Filed: Apr. 27, 2020

(65) Prior Publication Data

US 2021/0334563 A1 Oct. 28, 2021

(51) Int. Cl.

| | |
|---|---|
| *B60R 11/04* | (2006.01) |
| *G06V 40/10* | (2022.01) |
| *H04N 5/33* | (2006.01) |
| *B60W 40/08* | (2012.01) |
| *G06V 20/59* | (2022.01) |
| *B60W 50/00* | (2006.01) |
| *G07C 5/08* | (2006.01) |
| *G07C 5/00* | (2006.01) |
| *B60R 11/02* | (2006.01) |

(Continued)

(52) U.S. Cl.
CPC ........ *G06V 20/593* (2022.01); *B60R 11/0247* (2013.01); *B60R 11/04* (2013.01); *B60W 40/08* (2013.01); *B60W 50/00* (2013.01); *G06N 20/00* (2019.01); *G06V 40/10* (2022.01); *G07C 5/008* (2013.01); *G07C 5/085* (2013.01); *H04N 5/33* (2013.01); *H04W 4/40* (2018.02); *B60R 2300/8006* (2013.01); *B60W 2040/0881* (2013.01); *B60W 2050/0075* (2013.01); *B60W 2556/50* (2020.02)

(58) Field of Classification Search
CPC .. G06V 20/593; G06V 40/10; B60R 11/0247; B60R 11/04; B60R 2300/8006; B60R 1/00; B60W 40/08; B60W 50/00; B60W 2040/0881; B60W 2050/0075; B60W 2556/50; G06N 20/00; G07C 5/008; G07C 5/085; H04N 5/33; H04W 4/40
USPC ....................................................... 348/148
See application file for complete search history.

(56) References Cited

U.S. PATENT DOCUMENTS

| | | | |
|---|---|---|---|
| 6,768,420 B2 * | 7/2004 | McCarthy ............ | H03K 17/955 340/425.5 |
| 2005/0024188 A1 * | 2/2005 | Sider ...................... | B60R 99/00 340/425.5 |

(Continued)

*Primary Examiner* — Susan E. Torgerson
(74) *Attorney, Agent, or Firm* — Loeb & Loeb LLP (57) ABSTRACT

A method and system for detecting one or more living beings in a vehicle. An indication that the engine is off is received via on on-board diagnostics (OBD) device. Whether a first living being is in the front seat area is determined, and whether a second living being is in the back seat area is determined. In response to a determination that a first living being is not in the front seat area and a second living being is in the back seat area, a first temperature reading for a first temperature inside the vehicle is received and a second temperature reading for a second temperature outside the vehicle is received. A delta between the first temperature and the second temperature is computed. If the delta is less than a first threshold, then an alert is sent via the OBD device to a computing device associated with a user.

18 Claims, 7 Drawing Sheets

(51) Int. Cl.
*H04W 4/40* (2018.01)
*G06N 20/00* (2019.01)

(56) References Cited

U.S. PATENT DOCUMENTS

| | | | |
|---|---|---|---|
| 2017/0232895 A1* | 8/2017 | Sines | G08B 25/016 |
| | | | 348/148 |
| 2017/0240110 A1* | 8/2017 | Lopez-Hinojosa | B60R 11/04 |
| 2018/0370431 A1* | 12/2018 | Wincek | G10L 25/78 |
| 2019/0009715 A1* | 1/2019 | Gage | G08B 21/14 |
| 2019/0077217 A1* | 3/2019 | Yu | B60H 1/00985 |
| 2019/0088104 A1* | 3/2019 | Crewe | B60R 21/01542 |
| 2021/0303887 A1* | 9/2021 | Dingli | G06T 7/74 |

* cited by examiner

BACK SEAT DETECTION SYSTEMS AND METHODS

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Recent news about twin infants dying in the back seat of a vehicle is tragic and, unfortunately, not a rare occurrence. Since 1998, over 840 children have died due to pediatric vehicular heatstroke as of the date of this writing. Most of the deaths were the result of an adult forgetting that a child was in the back seat of a vehicle or a child gaining access on their own and unintentionally locking themselves in a vehicle when the outdoor temperature is unsafe. In addition to children, pets too are often the victim of deadly heatstroke as a result of being left in a hot vehicle. Accordingly, there exists a need for a back seat detection system and method for detecting living beings in the back seat of a vehicle that are in distress and/or exposed to an unsafe temperature.

SUMMARY

A method for detecting one or more living beings in a vehicle is disclosed. The vehicle has an engine, a front seat area, and a back seat area. An indication that the engine is off is received via on on-board diagnostics (OBD) device. Whether a first living being is in the front seat area is determined using a first sensor, and whether a second living being is in the back seat area is determined using a second sensor. In response to a that a first living being is not in the front seat area and a second living being is in the back seat area, a first temperature reading for a first temperature inside the vehicle is received and a second temperature reading for a second temperature outside the vehicle is received. A delta between the first temperature and the second temperature is computed. Whether the delta is less than a first threshold is determined. If the delta is less than a first threshold, then an alert is sent via the OBD device to a computing device associated with the user.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
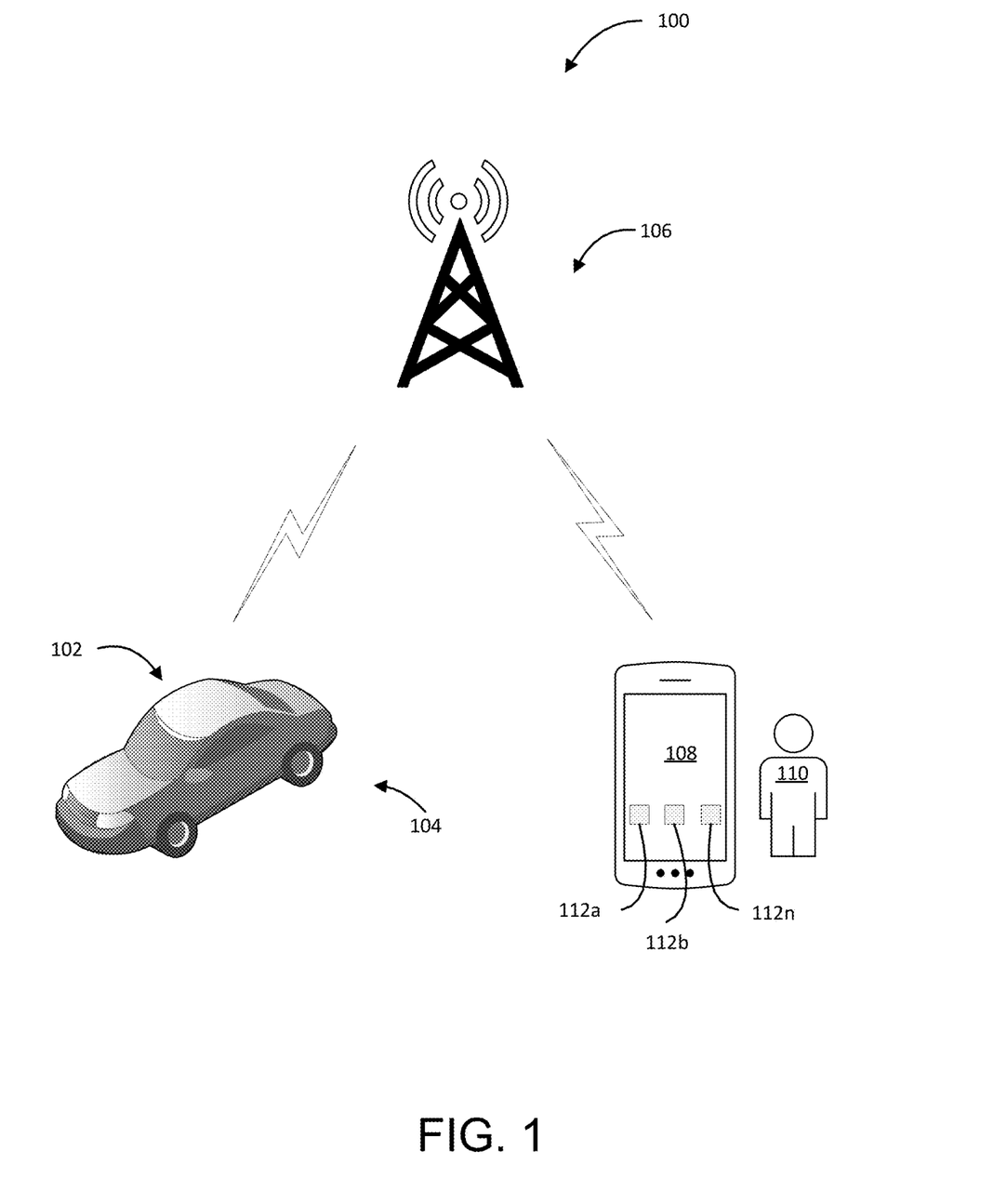
FIG. 1 is a high level schematic of an embodiment of a back seat detection system in accordance with the current disclosure.

FIG. 1 illustrates a high level exemplary back seat detection system 100. The back seat detection system 100 may include an on-board diagnostics (OBD) system 102. The OBD system 102 may be located in a vehicle 104.

The back seat detection system 100 may also include a communications network 106. The communications network 106 may be a cellular network or a Wi-Fi network or satellite.

The back seat detection system 100 may include a computing device 108 that may be associated with a user 110. The computing device 108 may be in communication with the OBD device 102 via the communications network 106. The computing device 108 may be, for example, a cell phone, a smart phone, tablet, laptop, or desktop computer. The computing device 108 may include one or more applications 112, for example applications 112a, 112b, . . . , 112n, which may be downloaded onto the computing device 108.

Figure 2:
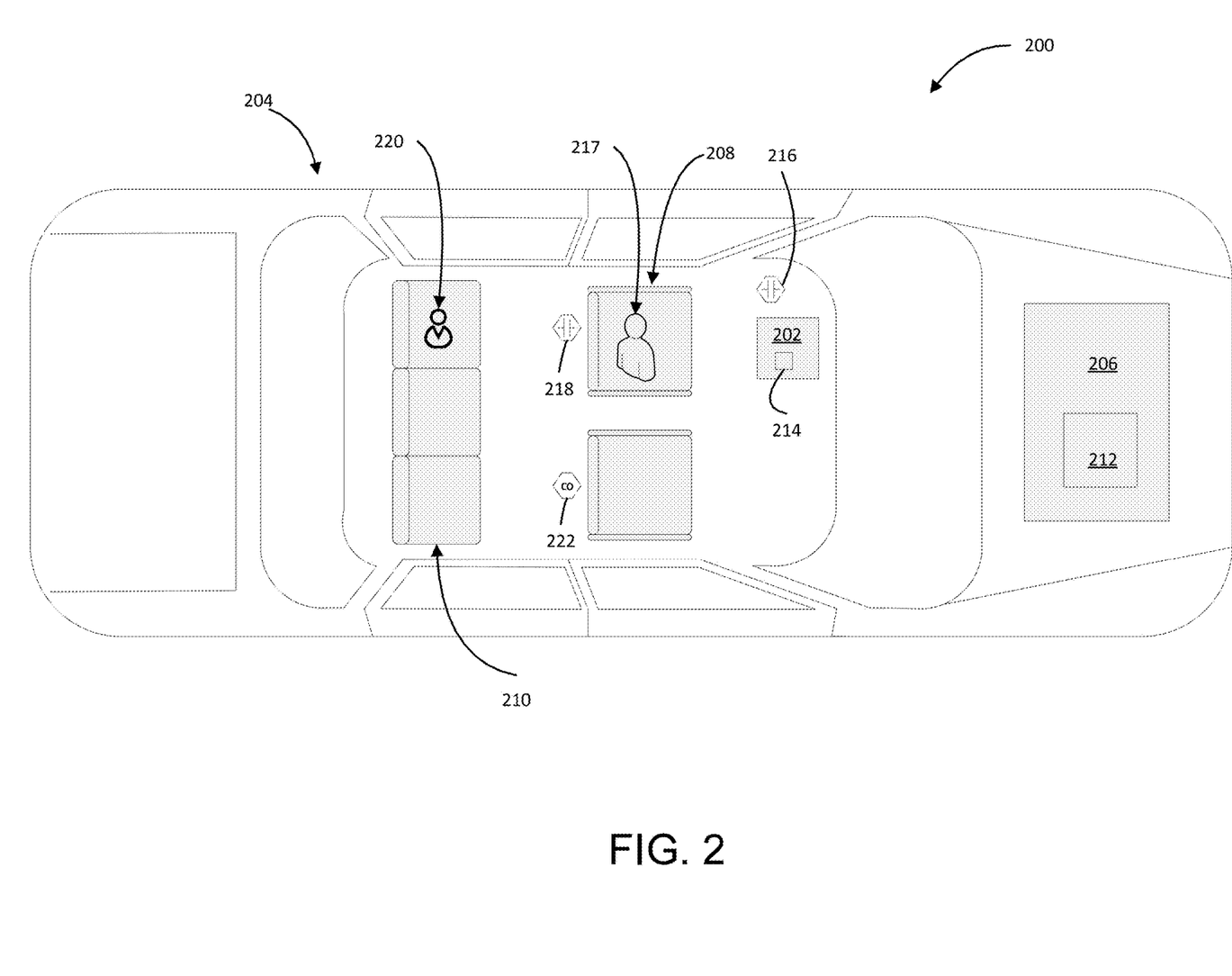
FIG. 2 is a schematic of an embodiment of an on-board diagnostics (OBD) system in accordance with the current disclosure.

FIG. 2 illustrates an exemplary OBD system 200. The OBD device system 200 may include a OBD device 202. The OBD device 202 may be located in the vehicle 204. The vehicle 204 may include an engine 206, a front seat area 208, and a back seat area 210.

The OBD device 202 may be in communication with the engine 206 of the vehicle via an engine control unit (ECU) 212. The ECU 212 may, for example, determine if the engine 206 is off or on. The ECU may also provide information about the vehicle's engine performance and drivability functions.

The OBD device 102 may include a built-in global positioning system (GPS) 214. The GPS 214 may be used to determine a location of the vehicle 204. The OBD device 202 may also provide information on the performance, health, and activity of the vehicle. The OBD device may be, for example, a device such as T-Mobile® SyncUP DRIVE® device.

The OBD system 200, may also include an OBD application, for example, application 112a. The OBD application 112a may be associated with the OBD device 202 and may be downloaded onto the computing device 108. The OBD application 112a may be, for example, the T-Mobile® SyncUP DRIVE® app. In other embodiments, the OBD system 200 may be acceptable through a computing device that is integral to the vehicle such as an advanced entertainment display device. The OBD application 112a and OBD device 202 may communicate according to a protocol which may define that certain data be located in certain places in a data packet such that data packets from the OBD system 200 and the OBD application 112a may be easily parsed and understood. In addition, as the protocol may be open, additional applications may be able to communicate with the OBD application and the OBD system 200.

The OBD system 200 may include one or more first sensors 216. The one or more first sensors 216 may be used to determine if a first living being 217 is in the front seat area 208. The first living being 217 may be a human or an animal or even goods that are sensitive to changes or extreme temperatures.

The one or more first sensors 216 may be any sensor that can detect a living being and may be located within the vehicle 204. In one embodiment, the one or more first sensors 216 may sense weight, which may indicate a living being is present. In another embodiment, the one or more first sensors 216 may sense sound which may indicate a living being is present. In yet another embodiment, the one or more first sensors may be a visual sensor which may indicate that a living being is present. In another embodiment, heat sensors may indicate a living being is present. In additional embodiments, there may be more than one sensor and the signals may be combined or analyzed to determine whether a living being is present. The one or more first sensors 216 may send one or more electronic signals to the OBD device 202 indicating that a first living 217 being is or is not detected in the front seat area 208.

The OBD system 200 may include one or more second sensors 218. The one or more second sensors 218 may be used to determine if a second living being 220 is in the back seat area 210. The second living being 220 may be, for example, a human or an animal The one or more second sensors 218 may be any sensor that can detect a living being and may be located within the vehicle 204. As previously described in relation to the one or more first sensors 216, the one or more second sensors 218 may sense weight, heat, movement, sound or other sensory events capable of being produced by a living animal and sensed with a sensor. The one or more second sensors 218 may send one or more electronic signals to the OBD device 202 indicating that a second living being is or is not detected in the back seat area 210.

The one or more first sensors 216 and the one or more second sensors 218 may be, for example, a microphone, camera, a heat sensor, an electronic scale and/or a motion sensor. The microphone may be used to detect noise from a living being. For example, the microphone may be used to detect noise above a certain threshold or unusual sounds. The camera may be a video camera, which can be used to detect a human visually or through movement. The camera may also be a thermographic camera which may detect living beings through infrared radiation. The motion sensor may be used to detect a living being based on movement. The motion sensor may be, for example, a Wi-Fi motion sensor or a passive infrared sensor. The one or more first sensors 216 and the one or more second sensors 218 may send the electronic signal to the OBD device via a wired or wireless connection. Furthermore, the one or more first sensors 216 and/or the one or more second sensors 218 or any of the other sensors mentioned herein may be devices that are separate from the OBD device 202 or incorporated into the OBD device 202.

The one or more first sensors 216 and the one or more second sensors 218 may determine if there is a living being present in the front seat area and back seat area, respectively, based on a time frame. For example, if the one or more first sensors 216 do not detect a living being in the front seat area 208 within a 5 minute period, then an electronic signal indicating that a living being is not present may be sent to the OBD device 202. However, if a living being is detected in the front seat area 208 within the 5 minute period, then an electronic signal indicating a living being is present may be sent. Alternatively, if a human being is detected in the front seat area 208, the one or more first sensors may not send any signal to the OBD device 202. Similarly, if the one or more second sensors 218 do not detect a living being in the back seat area 210 within a 5 minute period, for example, then an electronic signal indicating that a living being is not present may be sent to the OBD device 202. However, if a living being is detected in the back seat area 210 within the 5 minute period, then no electronic signal or an electronic signal indicating a living being is present may not be sent.

Figure 4:
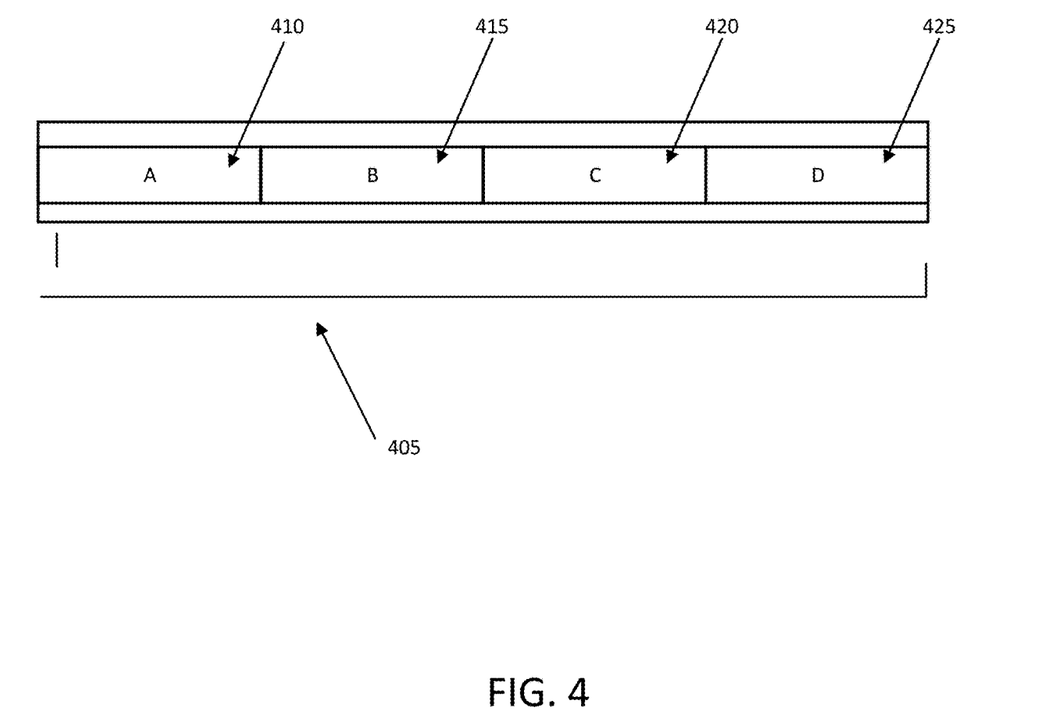
FIG. 4 is a schematic of an exemplary dataset to be used in machine learning.
Figure 5A:
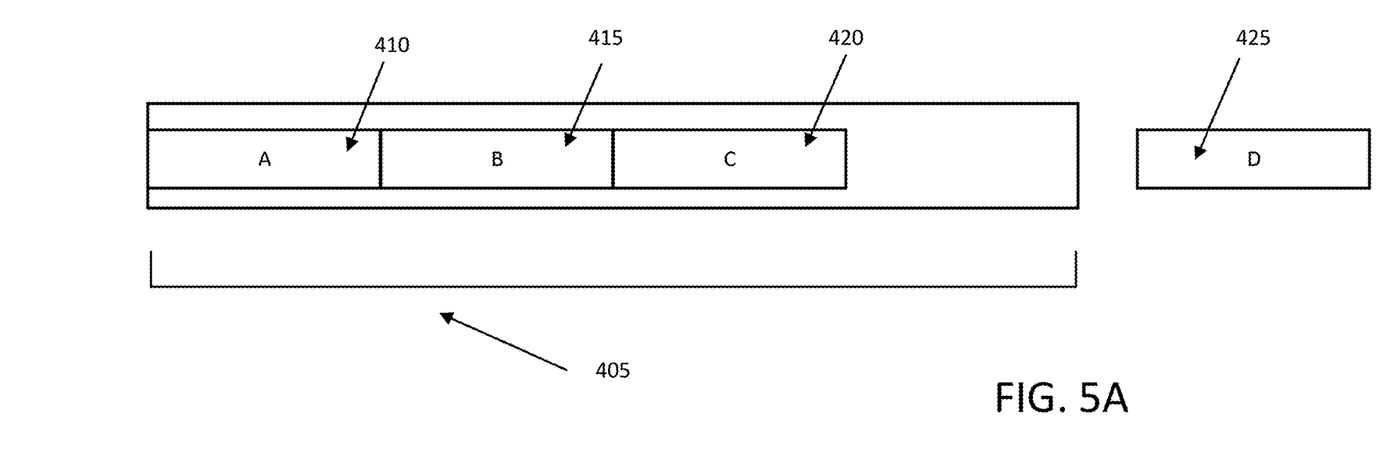
FIGS. 5A and 5B are schematics of exemplary machine learning methodologies; and, FIG. 6 is a schematic of an exemplary electronic device in accordance with the current disclosure.
Figure 5B:
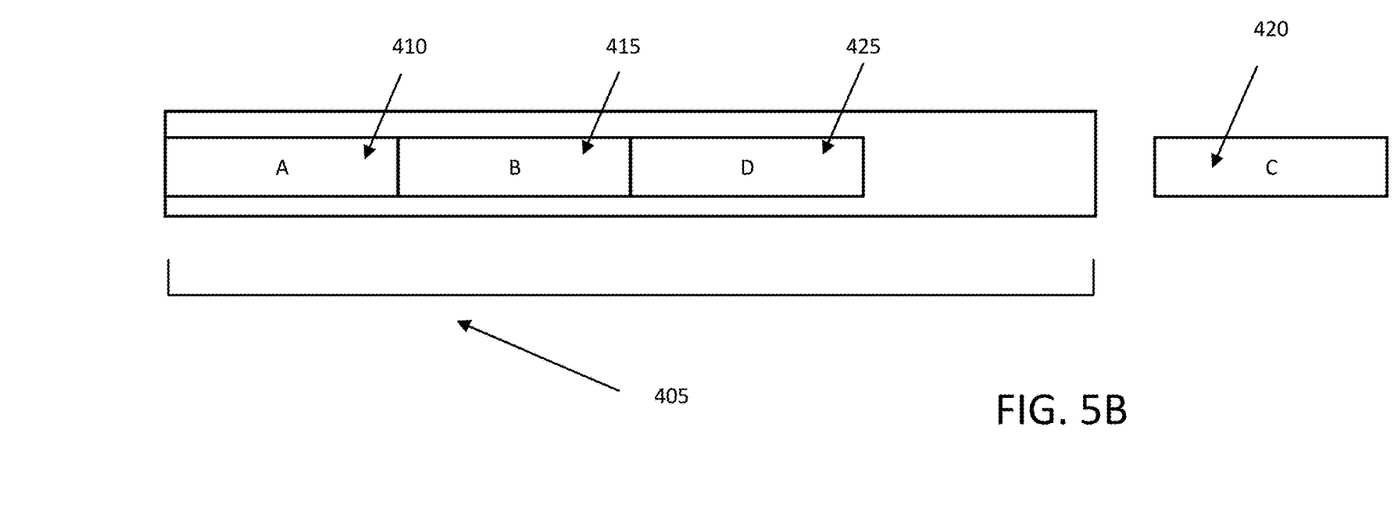

In one embodiment, machine learning may be used to detect the first or second living beings. In some embodiments, noise and movement thresholds may be refined over time. Machine learning may be used to analyze past thresholds in view of the actual results, so that the detection of a first living being or a second living being becomes more accurate (e.g., discern between external environmental noise or movement and internal noise and movement made by a living being). Machine learning may be used to review a training group of past thresholds and determine improved thresholds moving forward. FIG. 4 may illustrate sample artificial intelligence (AI) training data according to one or more embodiments. As an example and not a limitation, an artificial intelligence system may trained by analyzing a set of training data 405. The training data may be broken into sets, such as set A 410, set B 415, set C 420 and set D 425. As illustrated in FIG. 5A, one set may be used as a testing data set (e.g., set D 425) and the remaining sets may be used as a training data set (e.g., set A 410, set B 415 and set C 420). The artificial intelligence system may analyze the training data set (e.g., set A 410, set B 415 and set C 420) and use the testing set (e.g., set D 425) to test the model created from the training data. The data sets may shift as illustrated in FIG. 5B, where the testing data set may be added to the training data sets (e.g., set A 410, set B 415 and set D 425) and one of the training data sets that has not been used to test before (e.g., set C 420) may be used as the testing data set. The analysis of the new training data (e.g., set A 410, set B 415 and set D 425) may occur again with the new testing set (e.g., set C 420) being used to test the model and the model may be refined. The rotation of data sets may occur repeatedly until all the datasets have been used as the test data set. The model then may be considered complete and the model may then be used on additional data sets.

The OBD system 200 may include one or more third sensors 222. The one or more third sensors 222 may be located within the vehicle 204 and be used to obtain a first temperature reading for a first temperature inside the vehicle 204. The first temperature reading may include one or more of a temperature and humidity level inside the vehicle 204. The one or more third sensors 222 may be a temperature sensor e.g., a thermometer, a humidity sensor or a combined temperature and humidity sensor. The first temperature reading may be sent to the OBD device 202.

The OBD system 200 may obtain a second temperature reading for a second temperature outside the vehicle. The second temperature reading may be sent to the OBD device 202. The second temperature reading may include one or more of a temperature and humidity level outside the vehicle 204.

In one embodiment, the second temperature reading may be obtained by using the GPS 214 of the OBD device 202 to determine a location of the vehicle 204. Once the location of the vehicle 204 is determined, the temperature and/or humidity levels may be obtained by using a third party weather application, application programming interface (API), or website. The temperature and/or humidity levels may be obtained by the OBD application.

In one embodiment, one or more fourth sensors (not shown) are located on or in an external portion of the vehicle 204. The one or more fourth sensors may be used to measure temperature and humidity level outside the vehicle 204. The one or more fourth sensors may be a temperature sensor, a humidity sensor, or a combined temperature and humidity sensor.

Once the OBD device 202 has received all the electronic signals from the one or more first sensors, the one or more second sensors, and the one or more third sensors, such information may be sent to the OBD application 112a. The OBD application 112a may obtain the second temperature reading from a third party application, API, or website based on the location provided by the GPS 214 of the OBD device 202.

The OBD application 112a, may use the first temperature and the second temperature to determine a delta between the first temperature and the second temperature. The delta may be the difference between the first temperature and the second temperature.

Once the delta is computed, the delta may be compared to a first threshold or a second threshold. The first and second thresholds may be determined based on guidelines set or recommended by medical professionals, organizations, or other experts. The first and second thresholds may also be set by the user 110. However, the OBD application 112a may prevent the user 110 from setting first and second thresholds that are inconsistent with the posted guidelines.

In one embodiment, the first threshold may vary depending on the first temperature reading. For example, if the first temperature reading is 75 or above, then the first threshold may be set to 0, and any delta below the first threshold may trigger an alert. That way, any potential increase in the internal temperature of the vehicle, which could create an unsafe environment, would trigger an alert. For example if the threshold is 0 and the first temperature is 75 and the second temperature is 80, then the delta is −5 (75−80=−5), since −5 is less than 0, an alert would be generated.

In one embodiment, the second threshold may vary depending on the second temperature reading. For example, if the second temperature reading is below 45*, then the second threshold may be set for 5 and any delta greater than 5 would trigger an alert. That way, any potential decrease in the internal temperature of the vehicle, which could create an unsafe environment, would trigger an alert. For example, if the first temperature is 45 and the second temperature is 39, then the delta is 6 (45−39=−6), since 6 is greater than 5, an alert would be generated.

Figure 3:
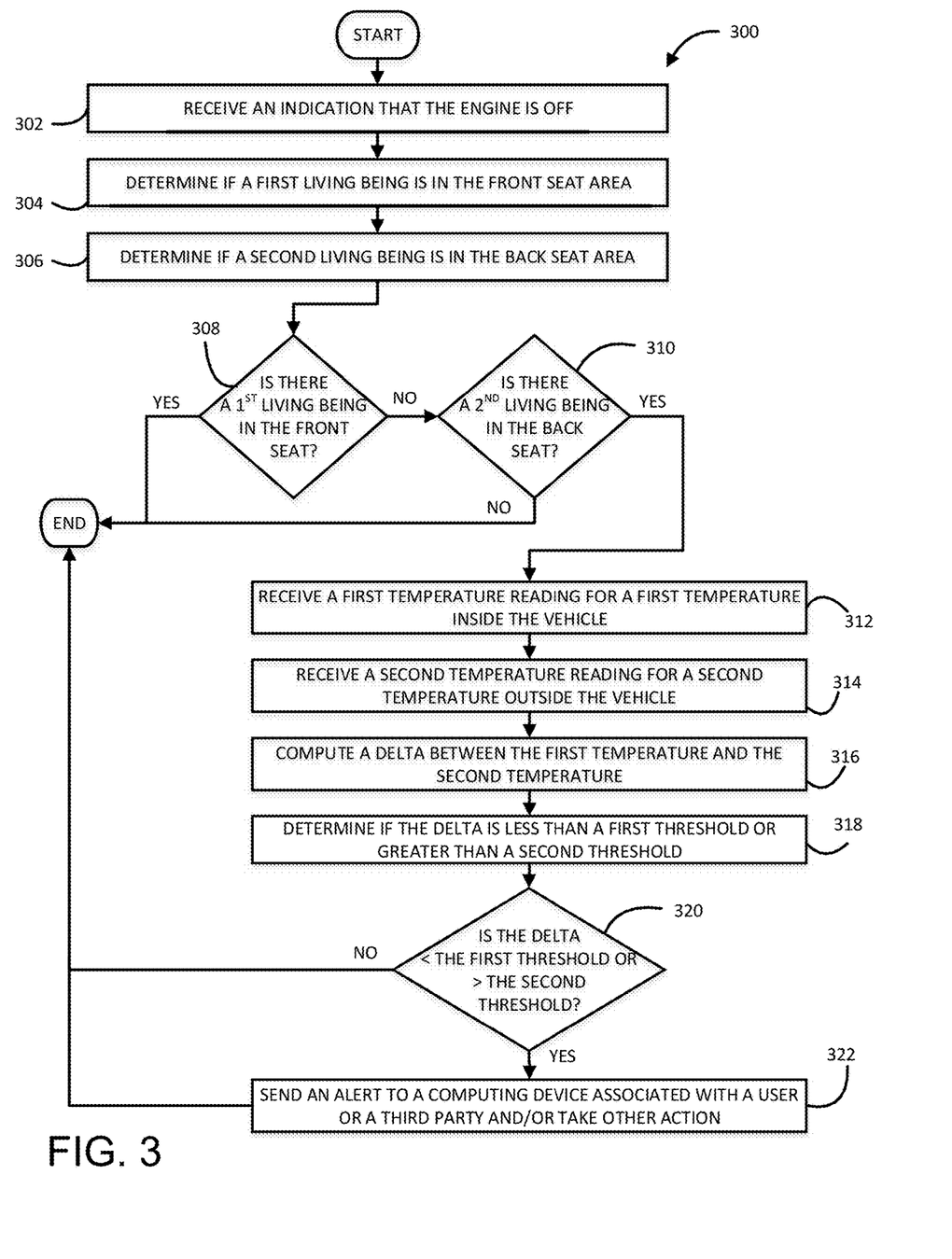
FIG. 3 is a flowchart of an embodiment of a method for back seat detection in accordance with the current disclosure.

FIG. 3 is a flowchart of an exemplary method 300 for detecting a living being in the back seat of a vehicle. At a block 302, an indication may be received that an engine (e.g., engine 206) of a vehicle (e.g., vehicle 204) is off or on. The indication may be sent by an engine control unit (e.g., ECU 212) to an on-board diagnostics (OBD) device such as OBD device 202, which receives the indication. In one embodiment, the indication may be an electronic signal that is sent from the ECU to the OBD device via a wired or wireless communication network.

At a block 304, whether a first living being (e.g., first living being 217) is in the front seat area, such as front seat area 208, of the vehicle 204 may be determined. A first sensor (e.g., one or more first sensors 216) may be used to determine whether the first living being 217 is present in the front seat area 208. An electronic signal may be sent from the first sensor 216 to the OBD device 202 via a wired or wireless communication network.

At a block 306, whether a second living being (e.g., second living being 220) is present in the back seat area (e.g., back seat area 210) of the vehicle 204 may be determined. A second sensor (e.g., one or more second sensors 218) may be used to determine whether a second living being 220 is present in the back seat area 210. An electronic signal may be sent from the second sensor 218 to the OBD device 202 via a wired or wireless communication network.

If it is determined that there is a first living being 217 in the front seat at a block 308 and/or that there is no second living being 220 in the back seat area 210 at a block 310, then the method may exit. Otherwise, if it is determined that there is no first living being 217 in the front seat area 208 and there is second living being 220 in the back seat area 208, then the method may proceed to a block 312.

At block 312, a first temperature reading for a first temperature inside the vehicle 204 may be received. The first temperature may be obtained by the third sensor (e.g., one or more third sensors 222). An electronic signal may be sent from the third sensor 222 to the OBD device 202 via a wired or wireless communication network.

At a block 314, a second temperature reading for a second temperature outside the vehicle 204 may be received. The second temperature may be obtained by a third party application, API, website, or an ambient air temperature sensor that is built into the vehicle 204.

At a block 316, a delta between the first temperature and the second temperature may be computed. The delta may be the difference between the first temperature and the second temperature.

At a block 318, whether the delta is less than a first threshold or greater than a second threshold may be determined by subtracting the second temperature from the first temperature.

If, at a block 320, the delta is greater than the first threshold or less than the second threshold, then the method may exit. If the delta is less than the first threshold or greater than the second threshold, then the method may proceed to a block 322. At block 322, an alert may be sent to a computing device (e.g., computing device 108) associated with a user. The alert may be sent from the OBD device 202 to the computing device 108 via the OBD application 112a.

In one embodiment, a second temperature reading for a temperature outside the vehicle may not be required, and a delta between the first temperature reading for a temperature inside the vehicle may not be computed. Rather, the first temperature may be obtained and directly compared to a threshold, and if the first temperature falls above or below the threshold, then an alert may be sent.

A user interface may be used to permit a user to adjust the threshold. For example, a user with older children may set a higher threshold than someone with an infant. Similarly, some environments and vehicle interiors may lend themselves to different thresholds than other vehicles. Threshold setting may be accomplished on a mobile computing device or on a computing device that may be part of the vehicle.

In addition, the user interface may be used to disable the system when a false alarm has occurred. For example, if the system believes a backpack is a human and the vehicle begins to communicate alarms, the user may adjust the system to recognize that the backpack is not in danger and that the alarms are not necessary at the current time.

As a result of the user adjusting the system, the system may become more intelligent over time. By studying data from the specific vehicle and from other similar vehicles which may be available from a central storage system, the system can better learn what alarm is appropriate for each circumstance. For example, if a vast majority of users indicate that a 5 degrees Fahrenheit delta is not worthy of a warning, the system may adapt to increase the delta.

Further, the system may observe and learn from other outside influences on the temperature of the vehicle to better adjust the OBD system. For example, if it is almost sunset, the heat from the sun may quickly disappear and the system may allow more variability in the delta as the vehicle may cool down naturally. Similarly, an approaching rainstorm may naturally cool the vehicle and the system may anticipate such natural cooling and may adjust the alarms based on the outside influences. Similarly, if it is approaching noon and the vehicle is in direct sunlight, the use of alarms may occur more quickly and more aggressively.

While the systems and methods are discussed in relation to the detection of a living being located in the back seat area of a vehicle, who may be in an unsafe environment, the systems and methods of the present disclosure may also be used to detect a living being, such as a pet, located in the front seat area of a vehicle, who may be in an unsafe environment. In this configuration, the systems and methods may only be concerned with the detection of a living being in the front seat area and may forgo the determination of a living being present in the back seat. Thus, the method may be performed based solely on whether a living being is present in the front seat (e.g., an alert is sent if a living being is detected in the front seat and the delta is above a threshold).

The present system and methods could be used to send an alert based on unusual noises or movements that are being made or whether a trigger word such as "help" is uttered by the living being. The present systems and methods may also be used to detect a distressed living being in a vehicle regardless of whether the engine is off, there are more than one living beings in the vehicle, or the internal temperature of the vehicle.

Figure 3A:
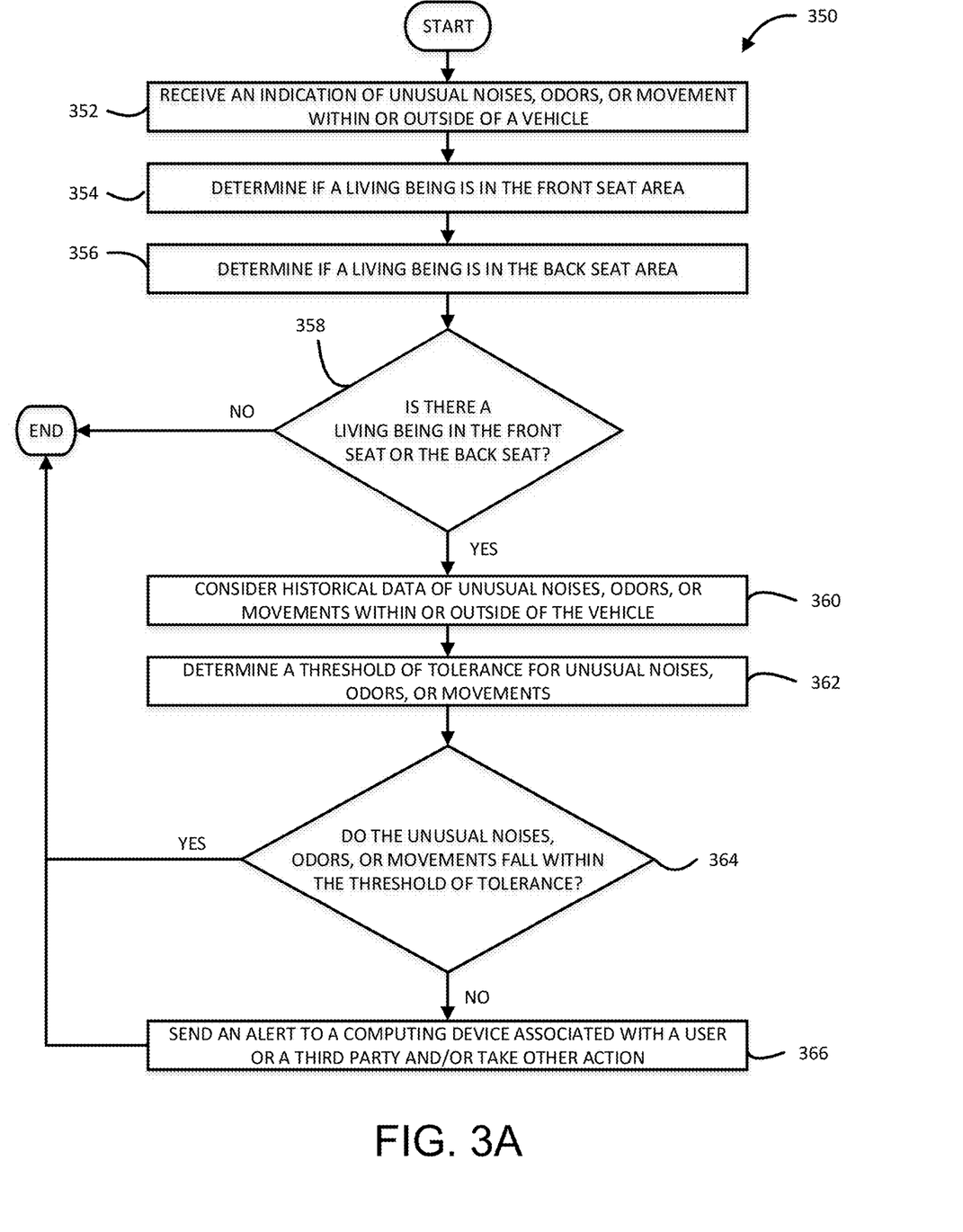
FIG. 3A is a flowchart of an embodiment of a method for front or back seat detection in accordance with the current disclosure.

For example, FIG. 3A shows an embodiment of a method 350 for front or back seat detection. The method 350 may be used to determine if one or more living beings are stuck in the vehicle, have gotten into an accident, are at risk due to other environmental factors such as toxins in the surrounding air, or are in distress due to a health condition unrelated to the weather (e.g., a seizure or heart attack) or because they are being attacked. The method 350 may be performed alone or in combination with all or some of method 300.

The method 350 may begin at a block 352 where an indication of an unusual noise, odor, or movement within or outside the vehicle may be received by the OBD device 202. The indication may come from one or more noise, odor, or movement sensors located inside or outside the vehicle 204. If an indication of unusual noise, odor, or movement within or outside the vehicle 204 is received, then the method may proceed to blocks 354 and 356 to determine if a living being is in the front seat area 208 or back seat area 210, respectively. Whether a living being is located in the front or back seat areas 208, 210 may be determined at a block 358 using any of the methods or apparatuses discussed herein. If no living beings are detected in the front or back seat areas 208, 210, then the method may end. Otherwise, if a living being is detected in either or both of the front or back seat areas 208, 210, then the method may proceed to a block 360.

At block 360, historical data of unusual noises, odors, or movements within or outside the vehicle 204 may be considered. The historical data may be collected and analyzed using artificial intelligence and machine learning. The historical data may be used to determine a threshold of tolerance at a block 362. At a block 364, whether the unusual noises, odors, or movements are within the threshold of tolerance is determined. If the unusual noises, odors, or movements are within the threshold of tolerance, the method may exit. However, if the unusual noises, odors, or movements are not within the threshold of tolerance, the method may proceed to a block 366, where an alert, for example, may be sent to the user or a third party.

In one embodiment the threshold of tolerance may be a number that is calculated by the OBD device 202. The unusual noises, odors, and movements may also be converted into a numerical value and compared to the threshold of tolerance. In another embodiment, the threshold for tolerance may default to zero or some other value that is provided by an external source. Thus, the method may send alerts more frequently when it is first being used. As time goes on and more data is collected, the threshold of tolerance may increase so that certain unusual noises, odors, or movements do not cause an alert to be sent. For example, if the vehicle 204 is parked next to a garbage truck the unusual odors may trigger an alert at first, but these odors may be filtered out in time as being unusual but not problematic, whereas high levels of toxins in the air due to smog or a fire, for example, may fall outside the threshold of tolerance and trigger an alert to be sent at block 366.

In some additional embodiments, the system and method may take other action at the blocks 322 or 366 such as execute a series of steps in response to determining the delta is over or under a threshold. In one embodiment, the windows may be lowered if the outside temperature is appropriate to cool down the vehicle or allow fresh air in or raised to warm the interior of the car or keep external pollutants out. Another step may include turning on a fan to cool the vehicle or turning a fan off. In yet another embodiment, the vehicle through the OBD device may engage the necessary equipment to operate an air conditioner or heater. In yet another embodiment, the OBD device may begin to communicate with a plurality of contacts to request assistance, such as first responders. In yet another embodiment, the OBD device may communicate noises, for example by honking the vehicle's horn, to attract attention from passing people to request assistance. Of course, all these steps may be progressively implemented or may be implemented at once.

In some embodiments, the system may take into account external factors in selecting the step to be executed. For example, if the outside temperature is extremely high, it may not make sense to roll down the windows of the vehicle as the problem may get worse and a more aggressive step of starting an air conditioner or phoning police may be appropriate. In another situation, if it is raining, it may not be appropriate to open the windows of the vehicle and operating the air conditioner may make more sense. The system may use sensors on the vehicle and data available through outside sources such as internet available weather services to adjust the system and method.

In addition, a user interface may be available for a user to adjust the steps to be executed. Some users may require repeated text messages of increasing frequency while other users may respond to a phone call. Similarly, some people may not respond to any messages to their portable computing device and the vehicle may have to handle the situations.

Figure 6:
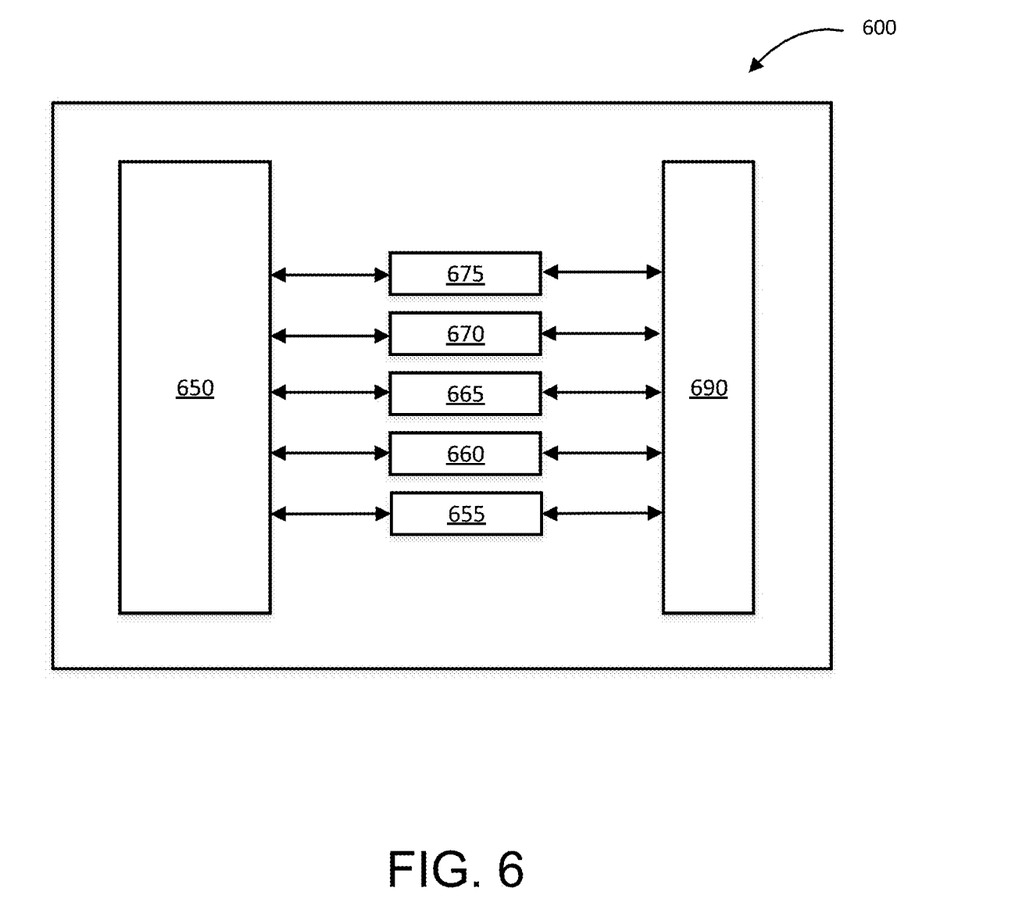

FIG. 6 may be an example electronic device 600, for example, OBD device 202, ECU 212, and computing device 108. The electronic device 600 may be physically configured to interact or communicate with other electronic devices via a communication network, such as a Wi-Fi network or a cellular network, for example, cellular network 106. The electronic device 600 may have a processor 650 that is physically configured according to computer executable instructions. The electronic device 600 may have a power supply 655 such as a battery, which may be rechargeable. The electronic device 600 may also have a sound and video module 660 which assists in displaying video and sound and may turn off when not in use to conserve power and battery life. The electronic device 600 may also have volatile memory 665 and non-volatile memory 670 as well as internal storage 675 or external storage. The electronic device 600 may have an input/output bus 690 that shuttles data to and from various user input devices such as a keyboard, mouse, speakers, or other inputs. It also may control communicating with other electronic devices and system components, either through wireless or wired devices. Of course, this is just one embodiment of the electronic device 600 and the number and types of electronic devices 600 is limited only by the imagination.

In accordance with the provisions of the patent statutes and jurisprudence, exemplary configurations described above are considered to represent one embodiment of the disclosure. However, it should be noted that the teachings of the disclosure can be practiced otherwise than as specifically illustrated and described without departing from its spirit or scope.

The electronic devices, computing devices, sensors, computers, routers, and/or servers described herein may be computers that may have, among other elements, a microprocessor (such as from the Intel Corporation, AMD or Motorola); volatile and non-volatile memory; one or more mass storage devices (e.g., a hard drive); various user input devices, such as a mouse, a keyboard, or a microphone; and a video display system. The user computing devices, computers, and servers described herein may be running on any one of many operating systems including, but not limited to WINDOWS, UNIX, LINUX, MAC OS, or Windows (XP, VISTA, etc.). It is contemplated, however, that any suitable operating system may be used for the present disclosure. The servers may be a cluster of web servers, which may each be LINUX based and supported by a load balancer that decides which of the cluster of web servers should process a request based upon the current request-load of the available server (s).

The electronic devices, computers, sensors, routers, and servers described herein may communicate via communications networks, including the Internet, WAN, LAN, Wi-Fi, cellular, or other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any servers, point of sale terminals, computing devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C+, C++, Python, Perl, or Assemble using, for example, conventional or object-oriented techniques.

The software code may be stored as a series of instructions or commands on a non-transitory computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus and may be present on or within different computational apparatuses within a system or network.

It may be understood that the present disclosure as described above can be implemented in the form of control logic using computer software in a modular or integrated manner. Based on the disclosure and teachings provided herein, a person of ordinary skill in the art may know and appreciate other ways and/or methods to implement the present disclosure using hardware, software, or a combination of hardware and software.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow diagram, a narrative, and/or in any other manner that provides sufficient structure for those of ordinary skill in the art to implement the recited process and its equivalents.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment. One or more features from any embodiment may be combined with one or more features of any other embodiment without departing from the scope of the disclosure. A recitation of "a", "an" or "the" is intended to mean "one or more" unless specifically indicated to the contrary. Recitation of "and/or" is intended to represent the most inclusive sense of the term unless specifically indicated to the contrary.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method for detecting one or more living beings in a vehicle, wherein the vehicle has an engine, a front seat area, and a back seat area, the method comprising:
   receiving, via an on-board diagnostics (OBD) device having a global positioning system (GPS), an indication that the engine is off;
   determining a location for the vehicle using the GPS;
   determining, via a first sensor, if a first living being is in the front seat area;
   determining, via a second sensor, if a second living being is in the back seat area;
   in response to a determination that a first living being is not in the front seat area and a second living being is in the back seat area,
      receiving a first temperature reading for a first temperature inside the vehicle;
      receiving a second temperature reading from a third party weather application for a second temperature outside the vehicle;
      computing a delta between the first temperature and the second temperature;
      receiving a first threshold from a user interface of a computing device associated with a user;
      adjusting the first threshold based on a time of day;
      determining if the delta is greater than the first threshold;
      if the delta is greater than the first threshold, sending an alert from the OBD device to the computing device associated with the user; and
      receiving from the user interface of the computing device an indication to disable the alert.

2. The method of claim 1, wherein the OBD device is in communication with an engine control unit (ECU) of the vehicle.

3. The method of claim 2, wherein the ECU determines whether the engine is on or off.

4. The method of claim 1, wherein the OBD device communicates with the computing device associated with the user via a cellular network.

5. The method of claim 1, wherein the first sensor is a microphone, video camera, thermographic camera, or motion sensor.

6. The method of claim 1, wherein the second sensor is a microphone, video camera, thermographic camera, or motion sensor.

7. The method of claim 1, wherein machine learning is used to detect the second living being.

8. The method of claim 1, wherein the first living being is a human.

9. The method of claim 1, wherein the second living being is a human or an animal.

10. The method of claim 1, wherein the first temperature reading is obtained using a temperature sensor and a humidity sensor.

11. The method of claim 1, further comprising:
   sending the first temperature reading and the second temperature reading to the OBD device.

12. The method of claim 1, further comprising:
   determining if the delta is greater than a second threshold;
   if the delta is greater than the second threshold, sending an alert via the OBD device to a computing device associated with a user.

13. The method of claim 12, wherein the second threshold is calculated based on the second temperature.

14. The method of claim 1, wherein the first threshold is calculated based on the first temperature.

15. The method of claim 1, wherein the computing device is a smart phone, cell phone, tablet, laptop, or desktop computer.

16. A system for detecting one or more living beings in a vehicle, wherein the vehicle has an engine, a front seat area, and a back seat area, the system comprising:
   a communication network;
   an on-board diagnostic (OBD) device having a global positioning system (GPS) and configured to communicate with a computing device associated with a user via the communication network, the OBD having a processor for:
      receiving an indication that the engine is off;
      determining a location for the vehicle using the GPS;
      determining, via a first sensor, if a first living being is in the front seat area;
      determining, via a second sensor, if a second living being is in the back seat area;
      in response to a determination that a first living being is not in the front seat area and a second living being is in the back seat area,
         receiving a first temperature reading for a first temperature inside the vehicle;
         receiving a second temperature reading from a third party weather application for a second temperature outside the vehicle;
         computing a delta between the first temperature and the second temperature;
         receiving a first threshold from a user interface of a computing device associated with a user;
         adjusting the first threshold based on a time of day;
         determining if the delta is greater than the first threshold;

if the delta is greater than the first threshold, sending an alert from the OBD device to the computing device associated with the user; and receiving from the user interface of the computing device an indication to disable the alert.

17. The method of claim 16, wherein the communications network is a cellular network.

18. The method of claim 16, wherein the communications network is a Wi-Fi network.

\* \* \* \* \*